United States Patent

Kajiwara

[11] Patent Number: 6,085,014
[45] Date of Patent: Jul. 4, 2000

[54] APPARATUS FOR HOLDING A WIRE-SHAPED MEMBER

[75] Inventor: Yasushi Kajiwara, Kawaguchi, Japan

[73] Assignee: Enplas Corporation, Kawaguchi, Japan

[21] Appl. No.: 09/234,271

[22] Filed: Jan. 19, 1999

Related U.S. Application Data

[63] Continuation of application No. 08/853,342, May 8, 1997, abandoned.

[30] Foreign Application Priority Data

May 7, 1997 [JP] Japan .................................. 8-137704

[51] Int. Cl.[7] ....................................................... G02B 6/00
[52] U.S. Cl. .............................................................. 385/137
[58] Field of Search ..................................... 385/135–140

[56] References Cited

U.S. PATENT DOCUMENTS

| 4,611,888 | 9/1986 | Matsui et al. | 339/59 M |
| 4,759,599 | 7/1988 | Yamaguchi et al. | 385/88 |
| 4,787,138 | 11/1988 | Eaton et al. | 29/748 |
| 5,271,076 | 12/1993 | Ames | 385/26 |

*Primary Examiner*—Akm E. Ullah
*Attorney, Agent, or Firm*—Fish & Richardson P.C.

[57] ABSTRACT

A wire holder has holding pieces abutting against the optical fiber or other wire. The holding pieces are held by a connecting portion so as to be able to displace using positions away from the positions where the wire abuts as supporting points. When the wire is pressed by the holding pieces, the holding pieces displace using as supporting points positions away from the positions where the wire abuts so as to firmly hold the wire.

7 Claims, 10 Drawing Sheets

APPARATUS FOR HOLDING A WIRE-SHAPED MEMBER

This is a continuation of U.S. application Ser. No. 08/853,342, filed May 7, 1997 now abandoned.

BACKGROUND OF THE INVENTION

1. Field of the Invention

The present invention relates to a wire holder and also relates to an optical fiber connector, for example, for securing an optical fiber to a case by pressing an optical fiber inserted in the case by a holder. The present invention enables an optical fiber or other wire to be easily and reliably secured by using the pressing force from the optical fiber and using a position away from a holding piece receiving the pressing force as a supporting point for displacement of the holding pieces to press against the optical fiber.

2. Description of the Related Art

Conventionally, the optical fiber used for optical communication apparatuses has been comprised of a wire-like core cable comprised of a core formed in a circular cross-sectional shape or a core and cladding and of a jacket covering the core cable so as to enable various types of light to be transmitted by the core cable. Therefore, the core cable has been formed by optical glass or a plastic. Further, the jacket has been formed by urethane, polyethylene, vinyl, or other plastic.

Figure 20:
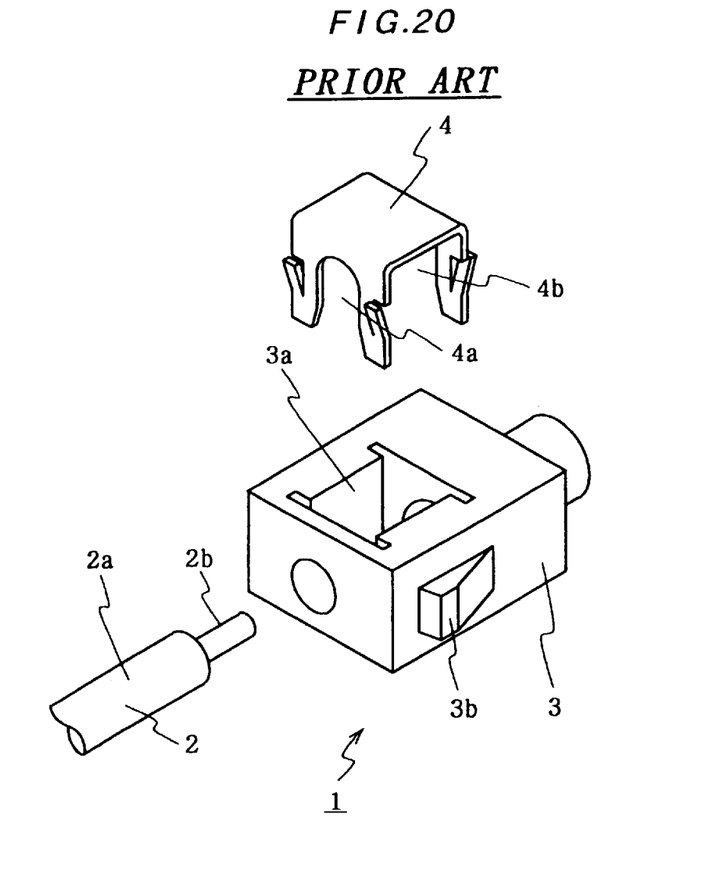
FIG. 20 is a disassembled perspective view of a conventional optical fiber connector.

As opposed to this, the optical fiber connector positions and holds the core cable through the jacket. The light emitted from the end face of the core cable is fired into an optical communications apparatus or another optical cable. For example, as shown in FIG. 20, the optical fiber connector 1 disclosed in Japanese Examined Utility Model Publication (Kokoku) No. 8-2643 inserts an optical fiber 2 into a plug 3 for positioning, then secures and holds the optical fiber 2 by a holding fitting 4.

That is, a through hole is formed from the rear end face of the plug 3 toward the front end. The front end side is formed so as to project out in a tubular shape along the through hole. The optical fiber 2 is stripped of its covering 2a in advance by a predetermined tool to expose the core cable 2b at the front end. In this state, it is inserted in the through hole of the plug 3. Due to this, the optical fiber connector 1 guides the optical fiber 2 by the through hole and positions the optical fiber 2.

The holding fitting 4 is formed by processing, for example, a metallic material into a U-shaped cross-section having the U-shaped grooves 4a and 4b at the front ends. This holding fitting 4 is inserted from the opening 3a of the plug 3 and pressed so that the optical fiber 2 is sandwiched by the U-shaped grooves 4a and 4b. The U-shaped grooves 4a and 4b thereby grip the optical fiber 2 from the outer side of the covering 2a. Due to this, the holding fitting 4 holds the optical fiber 2 at the plug 3 and prevents detachment of the optical fiber 2 from the through hole or rattling of the optical fiber 2.

In the optical fiber connector 1, by securing the optical fiber 2 in this way, it is made possible to connect to various apparatuses etc. by the pawl 3b formed at the side surface of the plug 3.

In this type of optical fiber connector, however, if the force holding the optical fiber 2 is weak, when a large force pulls upon the optical fiber 2, the optical fiber 2 will detach from the optical fiber connector.

In the optical fiber connector 1 shown in FIG. 20, the widths of the U-shaped grooves 4a and 4b may be made narrower to increase the force gripping the optical fiber 2 and, due to this, to increase the force holding the optical fiber 2. Further, it is also possible increase the number of the U-shaped grooves so as to increase the force holding the optical fiber 2.

If the force holding the optical fiber 2 is increased in this way, however, the stress acting on the core cable 2b also increases and the birefringence of the light in the core-cable 2b will increase by that much and the quality of transmission of the light will become impaired. Further, when the holding fitting 4 is inserted in the plug 3, it is necessary to press it by a large pressing force. Due to this, it becomes difficult to easily assemble the optical fiber connector 1.

Due to this, in the optical fiber connector 1 of the configuration shown in FIG. 20, in practice, there is the defect that it is difficult to increase the force holding the optical fiber 2 and there is the problem that it becomes difficult to reliably secure the optical fiber 2 by that amount.

As a method for solving these problems, the method of holding the optical fiber 2 by an adhesive etc. instead of the holding fitting 4 may be considered. Further, in the optical fiber connector of the configuration of FIG. 20, the method of increasing the holding force by post-processing may also be considered. In the case of these methods, however, there is the problem that it becomes difficult to easily connect the optical fiber 2 to the optical fiber connector.

SUMMARY OF THE INVENTION

Accordingly, the object of the present invention is to provide a wire holder and optical fiber connector able to easily and reliably secure an optical fiber or other wire.

To solve this problem, according to the present invention, there is provided a wire holder comprising a holding piece abutting against a wire and a connecting portion displaceably holding the holding piece by the pressing force of the wire to the holding piece using as a supporting point a position away from the position where the wire abuts, the wire being held by the holding piece pressing against the wire in a direction different from the direction of displacement of the holding piece so as to cause the holding piece to displace.

In the wire holder of the above configuration, if the wire is pressed by the holding piece, the holding piece will firmly hold the wire while displacing using as a supporting point a position away from the position where the wire abuts against it.

Further, according to the present invention, there is provided an optical fiber connector configured to hold an optical fiber used as a wire by causing displacement of a holding piece by the pressing force of the optical fiber against the holding piece using a position away from the position where the optical abuts against the holding piece as a supporting point and enables the optical fiber to be pressed against by the holding piece and the optical fiber to be held.

Preferably, in a configuration where the optical fiber is inserted into a through hole formed in the case of the optical fiber connector for positioning, then a holder is inserted from the opening, the holder has a pressing portion which is connected to the connecting portion and blocks the opening. By inserting it into the opening and pressing the pressing portion, the optical fiber is pressed against the holding piece.

At this time, preferably, the holder has a protrusion which latches on to the inside side surface of the opening.

Further, in this case, preferably, the holding piece has a protrusion which presses against the inside side surface of the opening.

Further, in these cases, preferably, the holder uses a plurality of holding pieces to press the optical fiber from the two side surfaces and hold the optical fiber.

Further, in these cases, preferably, the holding piece is configured to press against the optical fiber through a recessed pressing portion.

Further, in these cases, preferably, the holder is formed integrally from a metal sheet and, in the connecting portion, a supporting point is formed by the through hole formed in the metal material.

For example, in a configuration in which a wire holder is pressed against a wire positioned in a case etc. to hold the same or in a configuration in which the wire is pressed against a wire holder held in a case etc. to hold the same, if the holding piece is displaceably held using a position away from the position where the wire abuts against the holding piece as a supporting point, it is possible to cause the holding piece to displace by a small pressing force in accordance with the distance to the supporting point. As opposed to this, in the force by which the holding piece presses against the wire, by suitably selecting the position of the supporting point, it becomes possible for example to press the wire from a lateral direction with respect to the direction causing displacement of the holding piece and thereby obtain a large pressing force. Due to this, it is possible to cause the holding piece to displace by pressing the wire by a small pressing force and hold the wire by a large holding force.

Due to this, it is possible to apply a similar configuration to the holder of an optical fiber connector, apply the configuration of the holding piece and the connecting portion to the case side and further a holder separate from the case, and improve the holding force of the optical fiber by a small pressing force.

More specifically, when applying this to a holder separate from the case, inserting the optical fiber in a through hole formed in the case of the optical fiber connector for positioning, then inserting the holder from the opening, if configuring the connector to press a pressing portion blocking the opening to press the optical fiber against the holding piece, it is possible to use concurrently a sealing type fitting and holder in a hermetically sealed structure optical fiber connector.

Further, at this time, if a protrusion latching on to the inside side surface of the opening is formed in the holder, it is possible to prevent detachment of the holder.

Further, in these cases, when the holding piece has a protrusion pressing against the inside side surface of the opening, it is possible to prevent looseness of the holding piece.

Further, in these cases, if the holder uses a plurality of holding pieces to press the optical fiber from the two side surfaces to hold the optical fiber, it is possible to set the direction of displacement of the holding pieces due to the optical fiber and the direction of pressing of the optical fiber to a substantially perpendicular relationship and to obtain a large holding force by pressing the holder by a small pressing force.

Further, in these cases, if the holding piece presses against the optical fiber through a recessed pressing portion, it is possible to press the optical fiber sandwiched in the recessed portion and possible to effectively avoid concentration of partial stress in the optical fiber.

Further, in these cases, if the holder is formed integrally from a metal sheet, it is possible to form the holder by a simple configuration. Further, if a supporting point is formed by a through hole formed in the metal material in the connecting portion, it is possible to set the displacement of the holding piece to various values by the partial size of the metal sheet remaining after formation of the through hole. Due to this, it is possible to press the optical fiber by the holding piece by a desired pressing force according to the permanent deformation, plastic deformation, or elastic deformation of the holding piece.

DESCRIPTION OF THE PREFERRED EMBODIMENTS

The preferred embodiments of the present invention will be explained in detail below with reference to the drawings.

Figure 2:
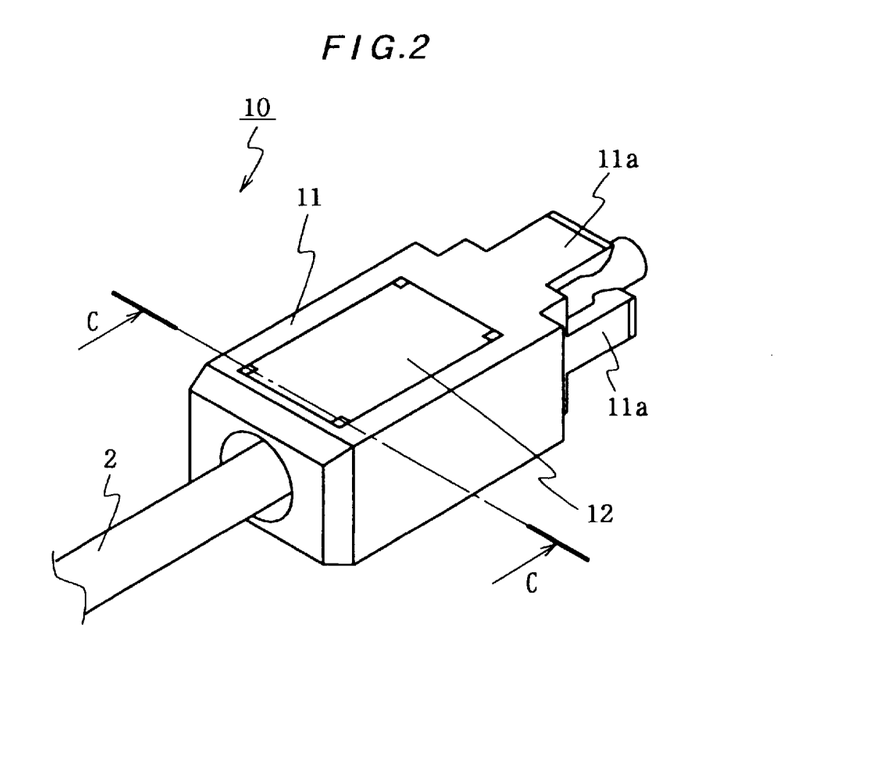
FIG. 2 is a perspective view of the overall configuration of the optical fiber connector shown in FIG. 1.

FIG. 2 is a perspective view showing the optical fiber connector 10 according to a first embodiment of the present invention. This optical fiber connector 10 inserts an optical fiber 2 with a core cable exposed at its front end from the rear end surface of a plug 11, then presses and inserts a holder 12 from the opening formed in its top surface so as to secure and hold the optical fiber 2 by the holder 12.

Figure 3A:
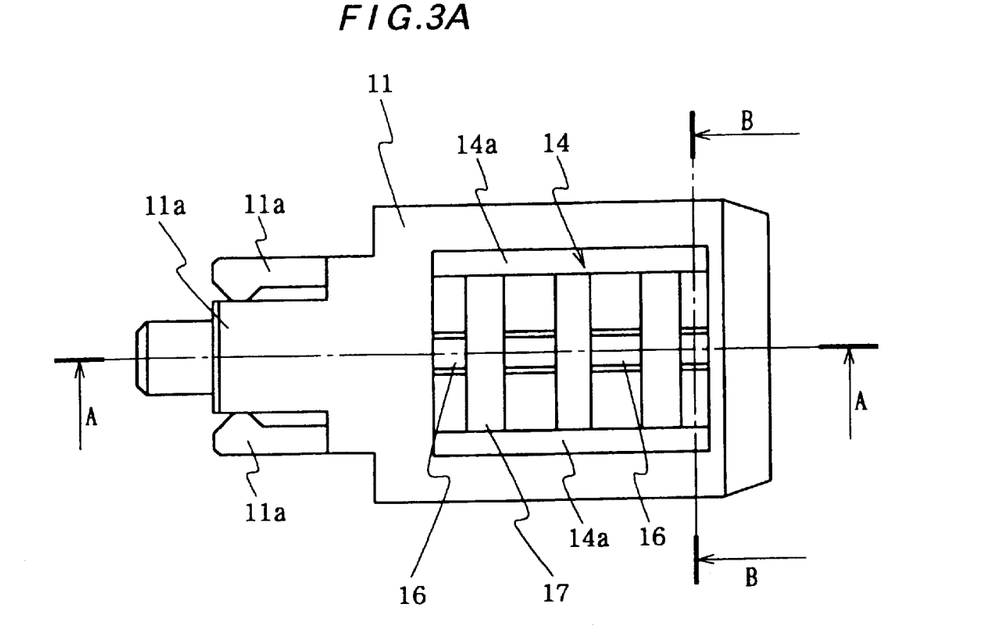
FIG. 3A is a back view of the plug of the optical fiber connector shown in FIG. 2.
Figure 3B:
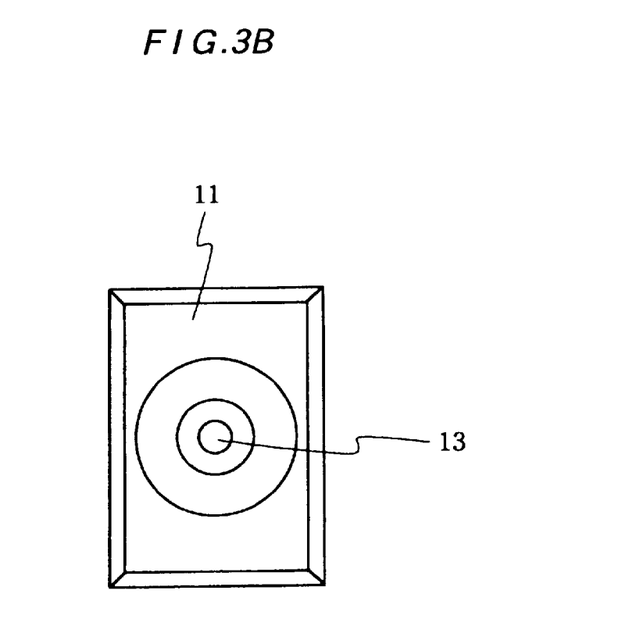
FIG. 3B is a plan view of the plug of the optical fiber connector shown in FIG. 2.
Figure 4:
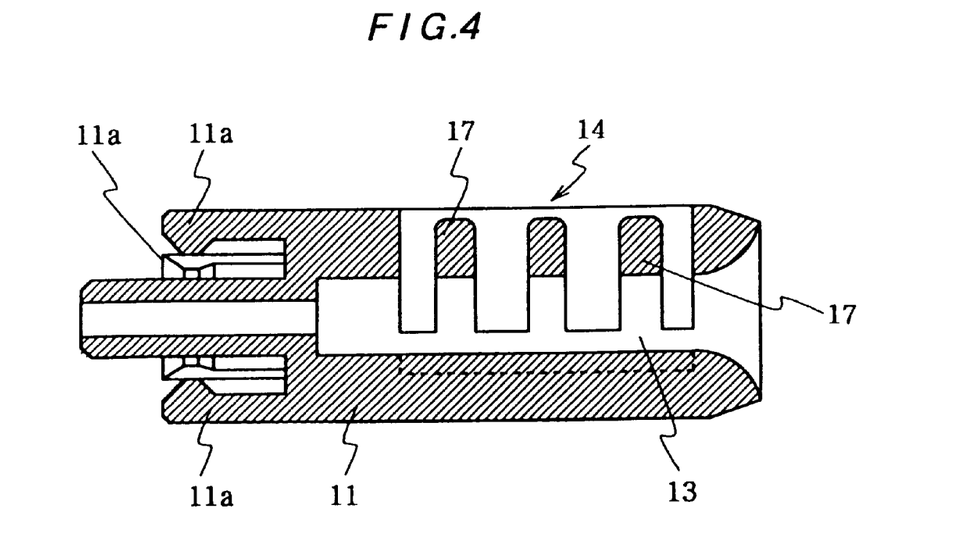
FIG. 4 is a sectional view along the line A—A in the figure of the plug shown in FIG. 3A.
Figure 5:
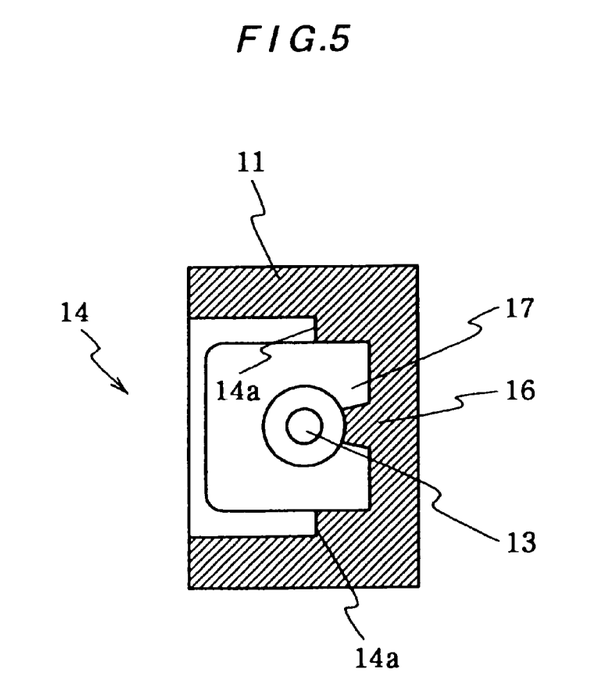
FIG. 5 is a sectional view along the line B—B in the figure of the plug shown in FIG. 3A.

That is, as shown in the back view and plan view of the plug 11 in FIG. 3A and FIG. 3B and in the sectional view along the lines A—A and B—B in FIG. 4 and FIG. 5, the plug 11 is formed in a substantially block shape by injection molding, has its front end projecting out in a tubular shape, and has a pawl 11a formed so as to surround the tubular shape. Due to this, the plug 11 is made able to easily connect the optical fiber connector 10 to a desired apparatus by plugging the front end tubular shape into the apparatus and latching it by the pawl 11a.

Further, the plug 11 is formed with a through hole 13 so as to extend from the tubular shape portion (see FIG. 4). The diameter of the through hole 13 is made to increase in stages, then gradually increase at the rear end surface side. Due to this, the plug 11 is made able to easily attach the optical fiber by inserting the optical fiber into the through hole 13 from the rear end side.

Further, the plug 11 is formed with an opening 14 at its top surface. Here, this opening 14 extends in a substantially block shape up to near the center axis of the through hole 13, then becomes smaller in width in a step to form the step portion 14a, then extends to the bottom side of the through hole 13 (see FIG. 5). At this time, this opening 14 is formed so as to leave behind the bottom portion of the through hole 13. Due to this, at the bottom of the through hole 13, a seat 16 for holding the optical fiber 2 is formed. Due to this, the plug 11 is formed to enable insertion of the holder 12 from the opening 14 and further is designed so that the optical fiber 2 will not shift in position from the seat 16 even if the holder 12 is inserted.

Further, at the inside of the opening 14, a plurality of walls 17 extending up to the bottom surface of the opening 14 are formed perpendicular to the through hole 13 (see FIG. 3A). At the plug 11, these walls 17 enable effective avoidance of deformation of the opening 14.

Figure 6A:
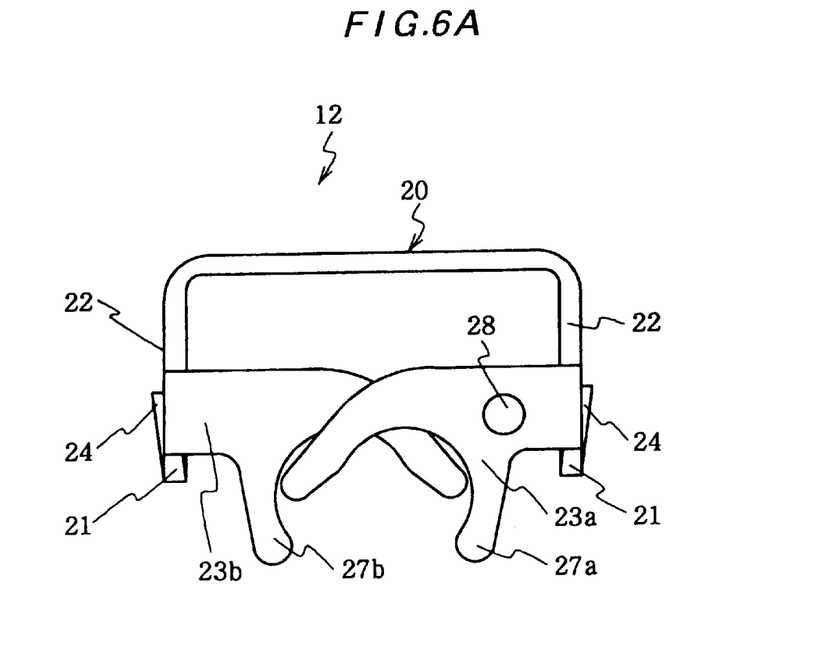
FIG. 6A is a front view of a holder of the optical fiber connector shown in FIG. 2.
Figure 6B:
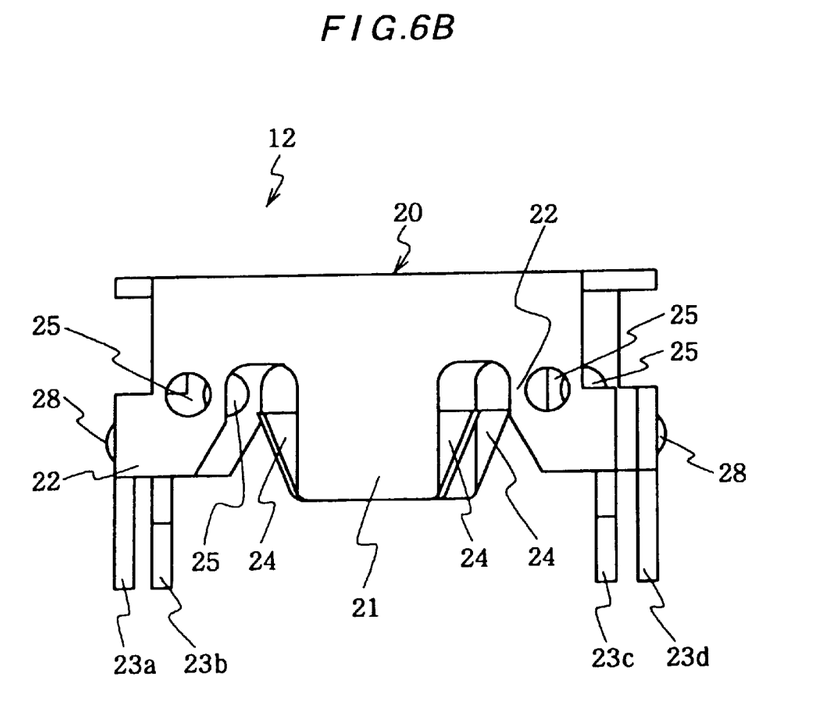
FIG. 6B is a side view of a holder of the optical fiber connector shown in FIG. 2.
Figure 7:
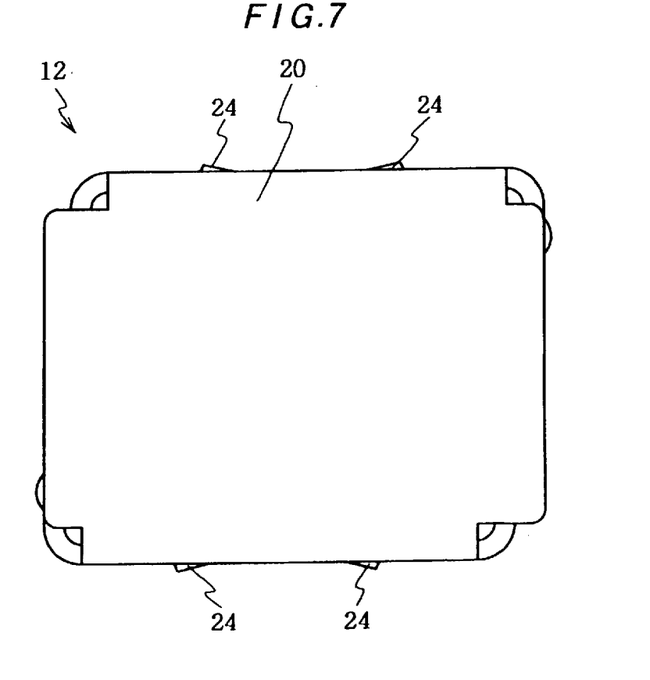
FIG. 7 is a plan view of a holder of the optical fiber connector shown in FIG. 2.

FIG. 6A and FIG. 6B are a front view and a side view of the holder 12, while FIG. 7 is a plan view of the holder 12. The holder 12 is formed by processing a sheet of metal to bend at the two side surfaces from a substantially rectangular shaped pressing portion 20 so as to form a holding portion 21 and a connecting portion 22, then bending the front end and the rear end from the connecting portion 22 to form a holding pieces 23a to 23d.

The pressing portion 20 is formed to substantially the same shape as the opening 14 of the holder 12 so as to block the opening 14 when inserted in the opening 14 (see FIG. 2 and FIG. 7).

The holding portion 21 is formed by bending the two side surfaces of the pressing portion 20, then projecting the center portion out in a tongue shape (see FIG. 6B). Further, the holding portion 21 is formed so as to increase gradually in amount of projection of the two ends of the tongue from the front end side toward the outside to form the stopper 24. Due to this, when the connecting portion 22 is inserted into the opening 14 of the plug 11, the stopper 24 bites into the inside side surface of the opening 14 so as to be able to prevent detachment from the plug 11 and over-insertion by a simple configuration. Further, when the holding portion 21 is inserted into the opening 14 of the plug 11, the front end abuts against the step portion 14a formed at the inside of the opening 14 whereby, in the optical fiber connector 10, the stopper is formed at the step portion 14a corresponding to the portion of the front end so as to be able to position the holder 12.

On the other hand, the connecting portion 22 is formed separate from the holding portion 21 at the two sides of the holding portion 21 across predetermined notches and is bent extending to the side opposite to the holding portion 21 to form the holding pieces 23a to 23d (see FIG. 6B). The connecting portion 22 is also formed with a through hole 25 of a predetermined size so the position of formation of the through hole 25 is formed so as to easily permanently deform compared with other portions. Due to this, when the connecting portion 22 is inserted into the opening 14 of the plug 11 and the holding pieces 23a to 23d are pressed by the optical fiber, the position of formation of the through hole 25 is used as the supporting point for displacement of the holding pieces 23a to 23d. Further, at this time, the connecting portion 22 is designed to enable selection of various forces required for displacement of the holding pieces 23a to 23d by suitable selection of the size of the through hole 25.

Further, at this time, since the connecting portion 22 is formed separate from the holding portion 21 across the notches, the holding pieces 23a to 23d can move using the position of formation of the through hole 25 as a supporting point. The state of the stopper 24 biting into the inside surface of the opening 14 is held as it is. Due to this, it is possible to prevent detachment of the plug 11 from the holder 12 and over-insertion. Note that at the supporting point of the connecting portion 22, when the holder 12 is completely pressed in, the elastic limit is exceeded and plastic deformation occurs.

Figure 8:
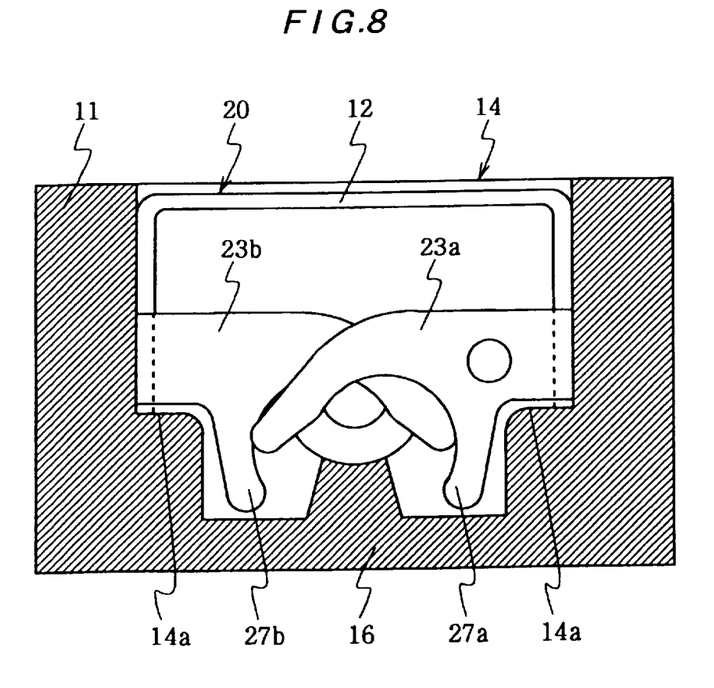
FIG. 8 is a sectional view similar to FIG. 1 showing the state where the optical fiber is not attached in the optical fiber connector shown in FIG. 1.
Figure 9:
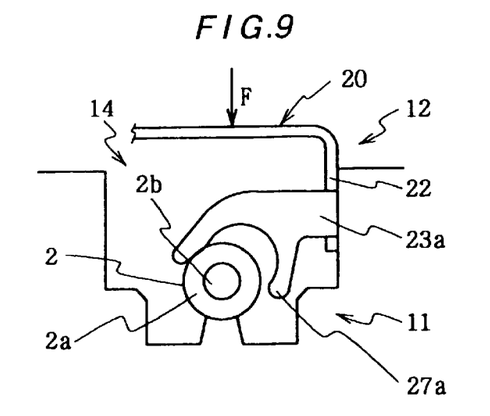
FIG. 9 is a sectional view of the starting step in the process of insertion of the holder of the optical fiber connector shown in FIG. 2.
Figure 10:
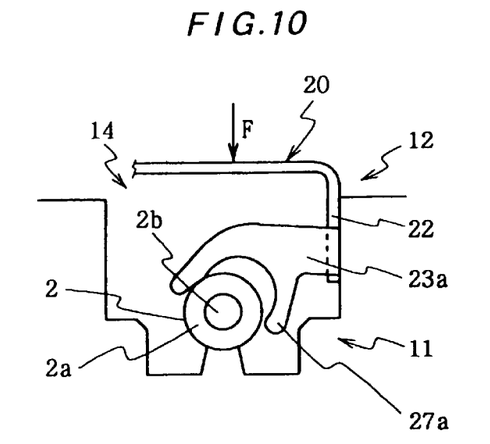
FIG. 10 is a sectional view of the step after the step shown in FIG. 9.
Figure 11:
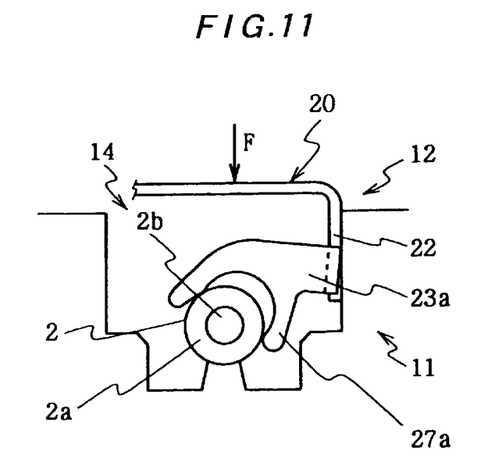
FIG. 11 is a sectional view of the step after the step shown in FIG. 10.
Figure 12:
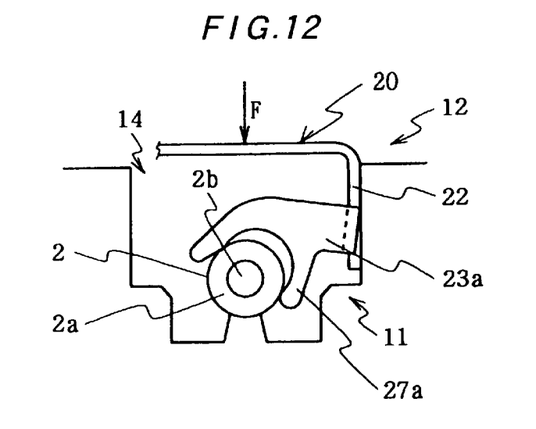
FIG. 12 is a sectional view of the step after the step shown in FIG. 11.
Figure 13:
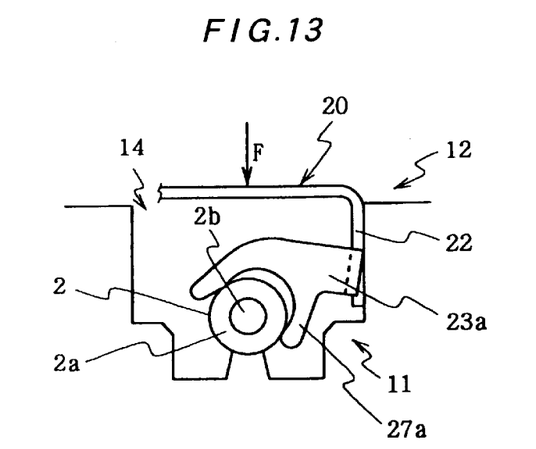
FIG. 13 is a sectional view of the step after the step shown in FIG. 12.
Figure 14:
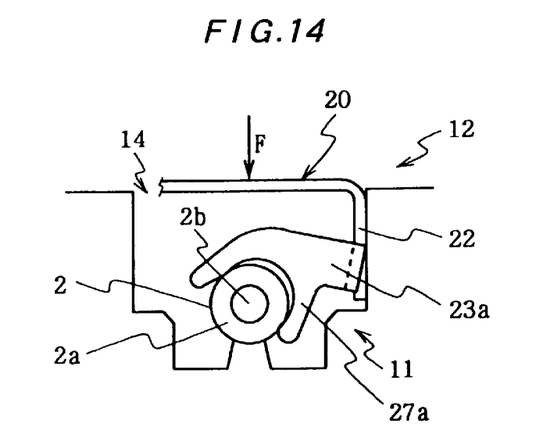
FIG. 14 is a sectional view of the step after the step shown in FIG. 13.
Figure 15:
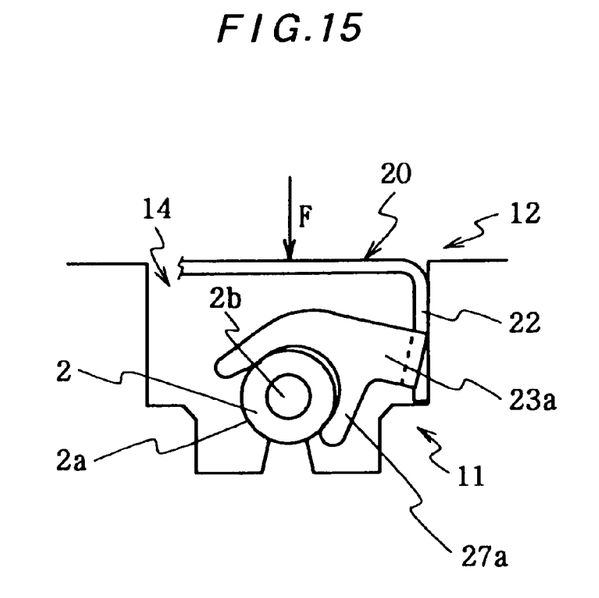
FIG. 15 is a sectional view of the step after the step shown in FIG. 14.
Figure 16:
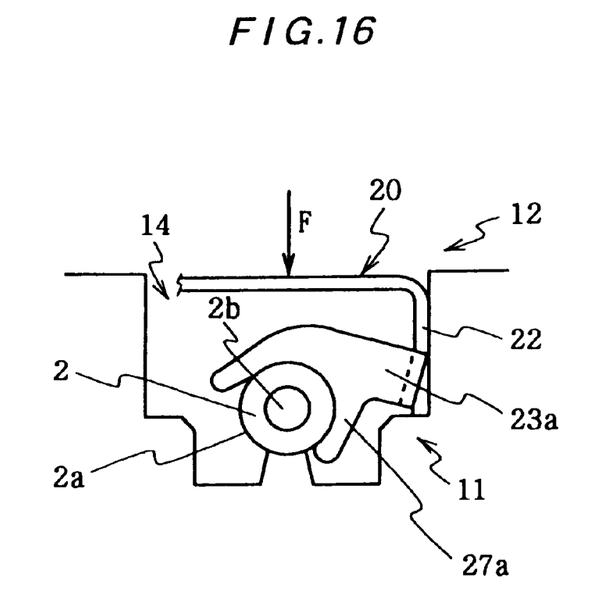
FIG. 16 is a sectional view of the step after the step shown in FIG. 15.

The holding pieces 23a to 23d are formed in such a way that the holding pieces 23a and 23b, as well as the holding pieces 23c and 23c, extending from the two side surfaces and crossing each other can be inserted into the corresponding spaces between the walls 17 of the plug 11 and, as shown in FIG. 8 showing the cross-section taken along the line C—C of FIG. 2 with the state in that the optical fiber is unloaded, can be positioned so as to cover and hide part of the through hole 13 from above at the time of insertion into the opening 14 of the plug 11 in a state without insertion of the optical fiber 2 (see FIG. 6A).

Figure 1:
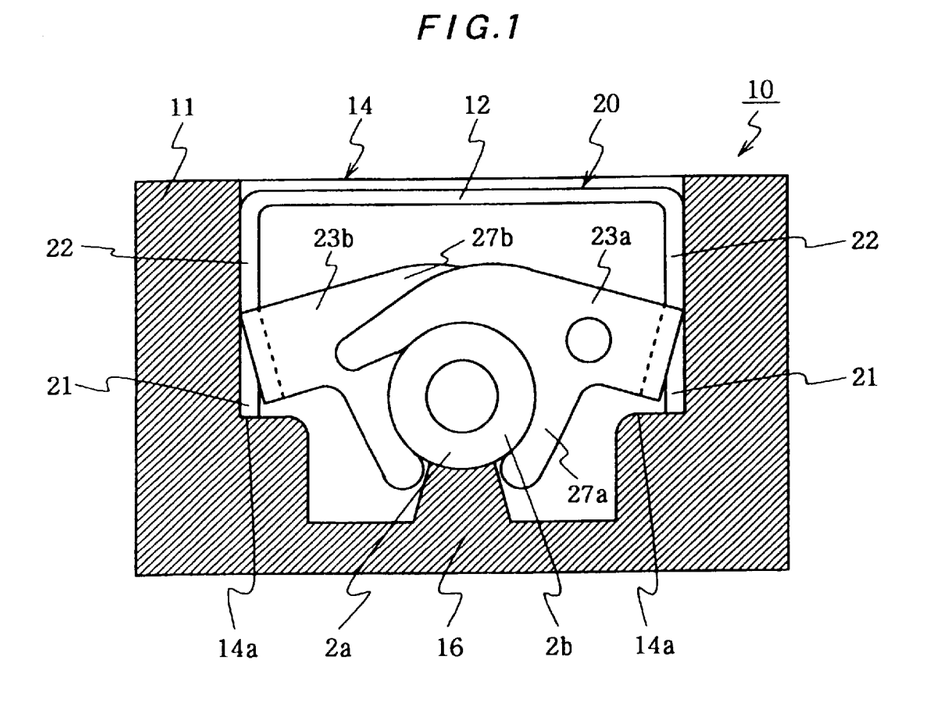
FIG. 1 is a sectional view of an optical fiber connector according to a first embodiment of the present invention.

More specifically, the holding pieces 23a to 23d are formed, at the front ends of the arms extending from the connecting portion 22, with the recessed pawls 27a to 27b of shapes which surround the jacket of the optical fiber 2 over the full to half circumference (see FIG. 6A). Here, these pawls 27a to 27b are formed so as to surround substantially the entire circumference of the optical fiber 2 together with the seat 16 as shown in FIG. 1 taking the cross-section of FIG. 2 from the line C—C. Further, at the outside holding piece 23a and 23d, semi-arc shaped protrusions 28 are formed projecting from the arms to the outside. Due to this, the holding pieces 23a to 23d, at the time of insertion into the opening 14, press against the inside side surface of the opening 15 by these protrusions 28 so the holder 12 and the optical fiber 2 do not move in the direction along the center axis of the through hole 13.

As opposed to this, the holding pieces 23a to 23d are formed so as to cover and hide part of the through hole 13 from above by the pawls 27a to 27b (see FIG. 8). Due to this, looking at the holding pieces 23a to 23d, showing the state of pressing and insertion of the holder 12 into the opening 14 taking as an example the holding piece 23a as shown in FIG. 9 to FIG. 16, first the jacket 2a of the optical fiber 2 abuts against the front end of the top of the pawl 27a (see FIG. 9). When further pressed, the holding piece 23a receives a pressing force from the optical fiber 2 and displaces using the position of formation of the through hole 25 in the connecting portion 22 as a supporting point (FIG. 10 to FIG. 16. At this time, the pawl 27a rotates around the circumference of the optical fiber 2 substantially about the center axis of the optical fiber 2. Finally, the front end of the holding portion 21 strikes the step portion 14a, whereupon, as shown in FIG. 1, the optical fiber 2 is enveloped and sandwiched from the two sides. Due to this, the pawls 27a to 27b constitute the pressing portion pressing against the optical fiber 2.

In the above configuration, the optical fiber 2 at the optical fiber connector 10 has the core cable at its front end exposed, then is inserted in the through hole 13 (see FIG. 4) of the plug 11 and is positioned by the through hole 13 and further by the seat 16 at the portion where the walls 17 of the opening 14 are not formed.

In this state, after the holder 12 is inserted from the opening 14, when the pressing portion 20 of the holder 12 (see FIG. 7) is pressed, the optical fiber 2 abuts against the pawls 27a to 27d formed at the holding pieces 23a to 23d of the holder 12 (see FIG. 9) to press the holding pieces 23a to 23d. Due to this pressing, the holding pieces 23a to 23d displace using the position of formation of the through hole 25 at the connecting portion 22 (see FIGS. 6a and 6b) as the supporting point (FIG. 10 to FIG. 16) and rotate about the substantially center axis of the optical fiber 2 so the pawls 27a to 27d rotate around the optical fiber 2. At this time, the optical fiber 2 gradually enters the recesses of the pawls 27a to 27d in accordance with the amount of insertion of the holder 12 and finally is held by the recesses and the seat 16.

At this time, by forming the supporting points at positions away from the positions where the optical fiber 2 abuts against the holding pieces 23a to 23d, it is possible to press against the pressing portion 20 and press and insert the holder 12 with a small pressing force.

If the amount of insertion is the prescribed amount, the front end of the holding portion 21 (see FIG. 6B) will abut against the step portion 14a formed at the inside of the opening 14 which will operate as a stopper and stop the operation of insertion of the holder 12. In this state, the stopper 24 formed at the holding portion 21 will bite into the inside side surface of the opening 14, Due to this, detachment of the holder will be prevented. Further, the pressing portion 20 (see FIG. 7) will cover and hide the opening 14 whereby entry of dust etc. will be reduced.

Further, the protrusions 28 formed at the outside holding pieces 23a and 23d (see FIG. 6A) press against the inside side surface of the opening 14 whereby looseness of the holder 12 and optical fiber 2 can be effectively avoided.

Further, the optical fiber 2 is sandwiched by the recessed pawls 27a to 27d and pressed from the two sides as shown in FIG. 1. Due to this, it is possible to press against the optical fiber 2 by various pressing forces in accordance with the intervals between the pawls 27a to 27d at the displaced positions.

Further, by pressing against the optical fiber 2 surrounded by the pawls 27a to 27d, it is possible to press against the optical fiber 2 avoiding a concentration of stress. Further, it is possible to press against the optical fiber 2 from the top and bottom directions between the seat 16 and the pawls 27a to 27d due to the elasticity of the connecting portion 22 even in the direction of pressing and insertion of the holder 12.

Due to this, the optical fiber connector 10 can press and insert the holder 12 and secure the optical fiber 2 by a small pressing force. Further, the optical fiber 2 is pressed by a large pressing force overall avoiding concentration of stress from the circumference. Due to this, it is held strongly at the plug 11. Due to this, the holding force of the optical fiber connector 10 is greatly improved from the past.

According to the above configuration, when securing the optical fiber by pressing and inserting the holder in the opening 14, by making the holding pieces 23a to 23d displace using the position of formation of the through hole 25 in the connecting portion 22 away from the positions where the optical fiber 2 abuts the holding pieces 23a to 23d as the supporting point and by using the displaced holding pieces 23a to 23d to press against and hold the optical fiber 2 from the two sides, it is possible to press and insert the holder 12 by a small pressing force and hold the optical fiber 2 by a large holding force. Due to this, it is possible to easily and reliably secure the optical fiber.

Figure 17:
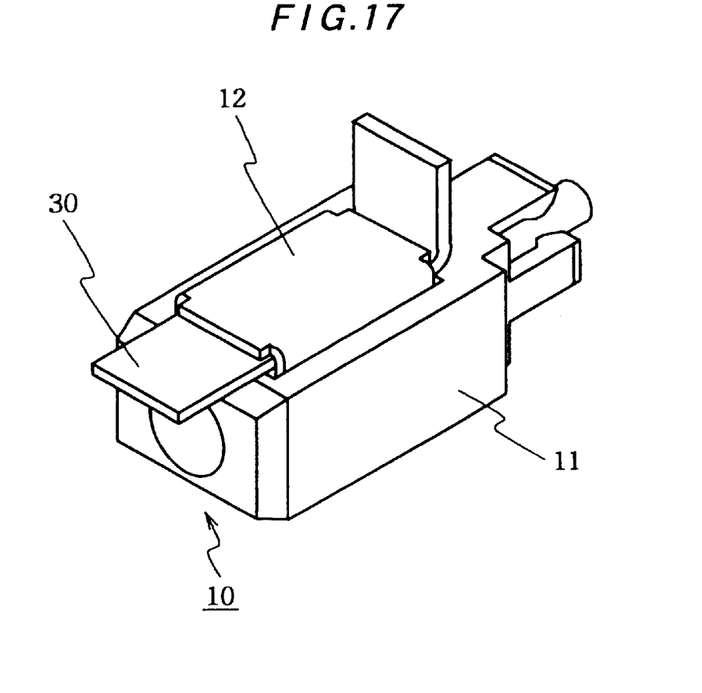
FIG. 17 is a sectional view of an optical fiber connector according to a second embodiment of the present invention.

FIG. 17 is a perspective view of the state before attachment of the optical fiber in an optical fiber connector according to a second embodiment of the present invention. That is, in the above-mentioned optical fiber connector 10, the stopper 24 formed at the holding portion 21 bites into the inside side surface of the opening 14. Due to this, as shown in FIG. 8, if the holder 12 is pressed in mistakenly in a state without the optical fiber 2 attached, it will become difficult to remove the holder 12. Note that in this case, a tool etc. is used to flex the holding portion 21 to the inside to remove the holder 12.

Therefore, in this embodiment, the holder 12 is held with the plug 11 sandwiching the spacer 30. The optical fiber connector 10 is transported in this state.

As shown in FIG. 17, by sandwiching the spacer 30 and holding the plug 11 and holder 12 as a pair, it is possible to effectively avoid mistaken insertion of the holder 12. Further, by transporting the plug 11 and the corresponding holder 12 integrally, at the work floor, the optical fiber 2 can be attached by the extremely simple work of just insertion of the optical fiber, then removal of the spacer 30 and pressing the holder 12. The optical fiber can be attached that much more simply. Further, entry of dust etc. during transport can be prevented as well.

Figure 18:
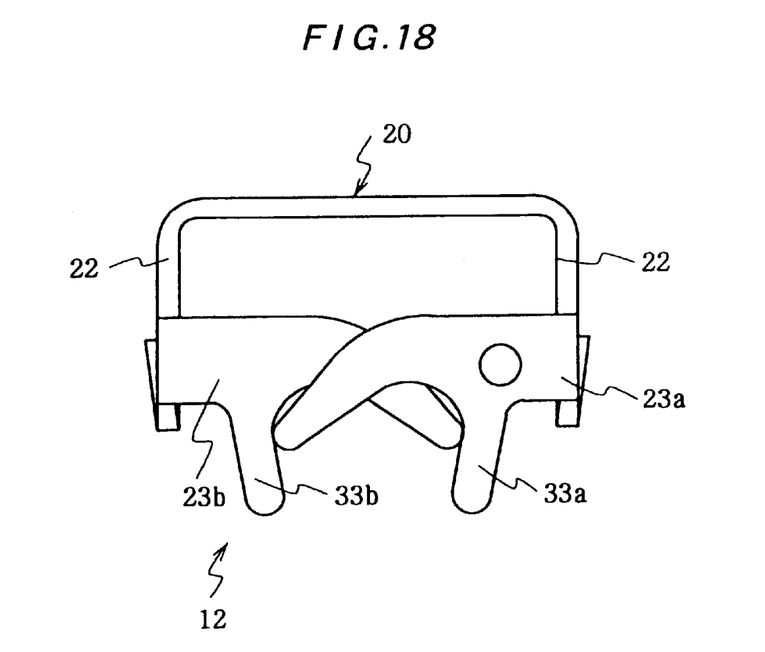
FIG. 18 is a front view of a holder of an optical fiber connector according to a third embodiment of the present invention.

Note that, in the above-mentioned embodiments, the case was explained where U-shaped grooves were formed in the holding pieces 23a to 23d, but the present invention is not limited to this. For example, as shown in FIG. 18, when the holding pieces are formed with substantially V-shaped pawls 33a, 33b, etc., it is possible to make wide use of the same for forming the pawls of recessed pawls.

Further, in the above-mentioned embodiments, the case was explained of forming two holding pieces for the front and rear of the optical fiber connector, but the present invention is not limited to this. The number of holding pieces can be modified in various ways. Further, in accordance with need, it is possible to combine the U-shaped groove and holding pieces mentioned with respect to FIG. 20 to form the holder.

Further, in the above-mentioned embodiments, the case was explained of pressing and holding the optical fiber by holding pieces 23a and 23b at the two sides, but the present invention is not limited to this. A so-called cantilever structure is also possible. That is, in this case, the holding pieces are arranged at just one side when forming the holder and a seat is provided in the direction of pressing of the holding pieces or the size of the seat is enlarged so as to be able to cope with the pressure by the holding pieces, so the optical fiber can be held by a holder of a simple configuration.

Further, in the above-mentioned embodiments, the case was explained of forming the through hole 25 in the connecting portion 22 to form the supporting point, but the present invention is not limited to this. It is also possible to form an elongated hole etc. to form the supporting point and further to omit this kind of hole and select the width and length of the connecting portion 22 to form the supporting point by part or all of the connecting portion 22. By doing this, it is possible to set the deformation at the supporting point to under the elastic limit and possible to repeatedly use the holder.

Further, in the above-mentioned embodiments, the case was explained of forming the supporting point avoiding at the two sides the direction in which the optical fiber is pressed, but the present invention is not limited to this. A similar effect can be obtained by forming the supporting point at various locations.

Further, in the above-mentioned embodiments, the case was explained of constituting the stopper by making the front end of the holding portion 21 abut against the step portion 14a of the opening 14, but the present invention is not limited to this. For example, it is possible to apply a wide variety of stoppers when forming the pressing portion 20 larger and making it abut against the plug 11.

Further, in the above-mentioned embodiments, the explanation was made of the case of using a metallic material to form the holder, but the present invention is not limited to this. It is possible to form it from a plastic as well. By doing this, it is possible to integrally form the plug and holder. Further, it is possible to form the pawl thicker and further reduce the concentration of the stress to obtain a large holding force. Further, instead of this, it is possible to form it by a shape retention alloy or shape retention plastic. By doing this, the holder can be repeatedly used.

Further, in the above-mentioned embodiments, the case was explained of forming holding pieces etc. at the holder side, but the present invention is not limited to this. It is also possible to form the holding pieces and other parts at the case, that is, the plug side. Further, it is possible to form the holding pieces etc. at both of the plug and holder.

Figure 19:
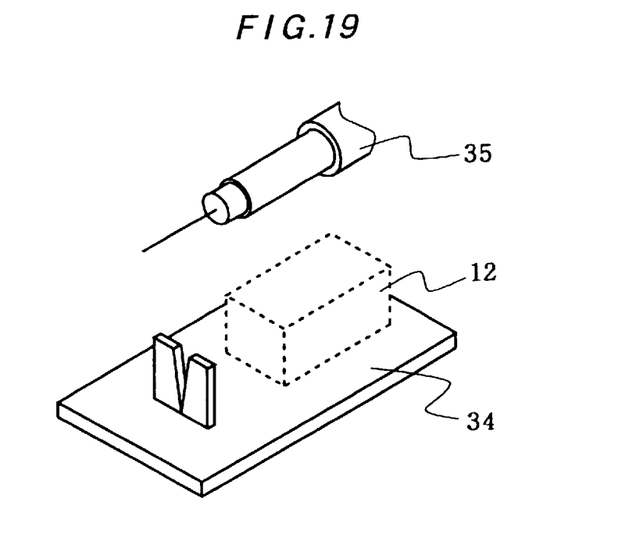
FIG. 19 is a perspective view of a holding mechanism of a coaxial cable according to a fourth embodiment of the present invention.

Further, in the above-mentioned embodiments, the case was explained of holding an optical fiber as a wire, but the present invention is not limited to this. It can be widely applied to cases of holding various types of wires. For example, as shown in FIG. 19, by securing this type of holder to a base material and pressing a coaxial cable, it is possible to hold a coaxial cable.

As clear from the above explanation, according to the present invention, by using the pressing force from a wire and using a position away from where the wire abuts as a supporting point for displacement of the holding pieces to press the wire, it is possible to easily and reliably secure an optical fiber or other wire.

What is claimed is:

1. An apparatus for holding a wire-shaped member, said apparatus comprising:

a base frame having a pair of side walls which are adapted to confront opposite sides of said wire-shaped member, respectively, and a base wall which is connected at opposite sides thereof to said side walls; and at least first and second holding pieces connected to said side walls of said base frame, respectively, and having respectively a pressure-receiving portion and a pressing portion, wherein said holding pieces are adapted to be pushed at said pressure-receiving portion by said wire-shaped member and displaced so as to press said opposite sides of said wire-shaped member at said pressing portion when said wire-shaped member is inserted between said side walls of said base frame by a pressing force applied thereon.

2. The apparatus as set forth in claim 1 further comprising a case having means for positioning said wire-shaped member thereon, and also having an attachment hole which has an opening and is adapted to receive said base frame through said opening, wherein said base frame is adapted to be fixedly held in said attachment hole of said case when said opposite sides of said wire-shaped member are pressed by said pressing portion of said holding pieces.

3. The apparatus as set forth in claim 2, wherein each said holding piece has protrusions projecting outward from said side walls and adapted to latch on said case within said attachment hole of said case when said opposite sides of said wire-shaped member are pressed by said pressing portion of said holding pieces.

4. The apparatus as set forth in claim 1, wherein each said holding piece has a through hole for enabling easy displacement of said pressure-receiving portion said pressing portion, said through hole being located at a position away from said pressure-receiving portion and said pressing portion.

5. The apparatus as set forth in claim 1, wherein said wire-shaped member is an optical fiber having a core cable and a jacket covering said core cable, while said holding pieces are adapted to press opposite sides of said jacket at said pressing portion.

6. The apparatus as set forth in claim 1, further comprising a base member connected to said base wall of said base frame.

7. The apparatus as set forth in claim 6, wherein said wire-shaped member is an electric cable.

* * * * *